United States Patent
Jacob (10) Patent No.: US 12,198,424 B2
(45) Date of Patent: Jan. 14, 2025

(54) VEGETATION INSPECTION USING MULTIPLE DIGITAL IMAGES

(71) Applicant: Nokia Technologies Oy, Espoo (FI)

(72) Inventor: Jacquilene Jacob, Yonkers, NY (US)

(73) Assignee: Nokia Technologies Oy, Espoo (FI)

( * ) Notice: Subject to any disclaimer, the term of this patent is extended or adjusted under 35 U.S.C. 154(b) by 379 days.

(21) Appl. No.: 17/724,412

(22) Filed: Apr. 19, 2022

(65) Prior Publication Data

US 2022/0343645 A1    Oct. 27, 2022

Related U.S. Application Data (60) Provisional application No. 63/178,186, filed on Apr. 22, 2021.

(51) Int. Cl.
| | |
|---|---|
| G06V 20/10 | (2022.01) |
| G06T 3/4038 | (2024.01) |
| G06T 7/187 | (2017.01) |
| G06T 7/55 | (2017.01) |
| G06T 7/90 | (2017.01) |

(52) U.S. Cl.
CPC .......... *G06V 20/188* (2022.01); *G06T 3/4038* (2013.01); *G06T 7/187* (2017.01); *G06T 7/55* (2017.01); *G06T 7/90* (2017.01)

(58) Field of Classification Search
CPC ...... G06V 20/188; G06V 20/68; G06T 7/187; G06T 2207/30188; G06T 3/4038; G06T 7/56; G06T 7/90; G06T 2207/10024; A01G 22/00; A01G 7/00

See application file for complete search history.

(56) References Cited

U.S. PATENT DOCUMENTS

| | | | |
|---|---|---|---|
| 10,713,777 B2 * | 7/2020 | Fox | ................. B64C 25/10 |
| 10,846,843 B2 | 11/2020 | Gonzalez et al. | |
| 2018/0121726 A1 | 5/2018 | Redden et al. | |
| 2021/0201025 A1 | 7/2021 | Ogawa | |
| 2021/0406538 A1 | 12/2021 | Lo et al. | |

(Continued)

FOREIGN PATENT DOCUMENTS

WO    2021255458 A1    12/2021

OTHER PUBLICATIONS

Ajay Kumar Maurya et al; Development of Fusion Approach for Estimation of Vegetation Fraction Cover with Drone and Sentinel-2 Data; IEEE 2018.

*Primary Examiner* — Bobbak Safaipour
*Assistant Examiner* — Michael Kim Maiden
(74) *Attorney, Agent, or Firm* — Duft & Bornsen, PC (57) ABSTRACT

Systems, methods, and software of inspecting growth areas for plants. In one embodiment, an inspection system captures a plurality of digital images of the growth area from different angles in relation to the growth area, and processes the digital images to identify a boundary of the growth area in the digital images. The inspection system combines the digital images based on the boundary identified in the digital images to generate a composite image of the growth area, and performs image processing on the composite image to detect one or more deficient growth regions in the growth area. The inspection system highlights the deficient growth regions in the composite image, and displays the composite image with the deficient growth regions highlighted.

20 Claims, 8 Drawing Sheets

(56) References Cited

U.S. PATENT DOCUMENTS

2023/0113890 A1\* 4/2023 Yutani .................. G01S 7/4868
356/5.01
2023/0146206 A1\* 5/2023 Unno ..................... G06V 10/28
382/110
2024/0177478 A1\* 5/2024 Itakura ................. G06V 10/764

\* cited by examiner

VEGETATION INSPECTION USING MULTIPLE DIGITAL IMAGES

RELATED APPLICATIONS

This non-provisional patent application claims priority to U.S. Provisional Patent Application No. 63/178,186 filed on Apr. 22, 2021, which is incorporated by reference as if fully provided herein.

TECHNICAL FIELD

This disclosure is related to the field of inspection techniques and, in particular, to inspection using digital images.

BACKGROUND

Plants, such as crops (e.g., that produce grain, fruits, or vegetables), herbs, flowers, trees, etc., may be grown in indoor or outdoor environments. Growers may manually inspect areas where the plants are growing to monitor the health of the plants. However, manual inspection such as this can be time consuming, and it is desirable to identify alternative methods of inspecting growth areas.

SUMMARY

Described herein is a solution that inspects a growth area for plants using digital images. Multiple digital images are taken of the growth area, such as from different fields of view or different angles with or without overlapping views. The digital images are combined to form a composite image of the growth area. The composite image is processed to identify one or more deficient growth regions in the growth area. The composite image may then be displayed with the deficient growth regions highlighted, such as with the deficient growth regions set to a distinctive color, a freeform shape surrounding the deficient growth regions, etc. One technical benefit is that the deficient growth regions may be automatically detected in the growth area via digital images, and provided to a grower so that steps may be taken to address the deficient growth regions.

In one embodiment, an inspection system comprises at least one processor and at least one memory including computer program code. The memory and the computer program code are configured to, with the processor, cause the inspection system at least to capture a plurality of digital images of a growth area for plants captured from different angles in relation to the growth area, process the digital images to identify a boundary of the growth area in the digital images, combine the digital images based on the boundary identified in the digital images to generate a composite image of the growth area, perform image processing on the composite image to detect one or more deficient growth regions in the growth area, highlight the deficient growth regions in the composite image, and display the composite image with the deficient growth regions highlighted.

In one embodiment, the digital images are captured with at least one camera mounted on a mobile platform.

In one embodiment, the processor further causes the inspection system to identify predetermined information for the growth area including coordinates for corners of the boundary in a coordinate system, identify pose information associated with the digital images, identify pixels in the digital images corresponding with the corners based on the pose information and the coordinates for the corners of the boundary in the coordinate system, and determine coordinates for the pixels based on the pose information and the coordinates for the corners of the boundary.

In one embodiment, the processor further causes the inspection system to identify the pixels in the digital images corresponding with the corners based further on pixel values for the pixels in the digital images.

In one embodiment, the processor further causes the inspection system to stitch the digital images based on the pixels corresponding with the corners to generate the composite image of the growth area.

In one embodiment, the processor further causes the inspection system to perform the image processing by extracting a hue of a Hue Saturation Value (HSV) color scale for pixels of the composite image, identifying a set of the pixels having a hue within a color range, generating a binary mask based on the set of the pixels, and overlaying the binary mask on the composite image to detect the deficient growth regions.

In one embodiment, the processor further causes the inspection system to fill pixels of the composite image corresponding with the deficient growth regions with a distinctive color.

In one embodiment, the processor further causes the inspection system to draw a freeform shape around contours of the deficient growth regions in the composite image.

In one embodiment, the processor further causes the inspection system to determine a largest one of the deficient growth regions in the growth area, and draw a bounding box around the largest one of the deficient growth regions in the composite image.

In one embodiment, the processor causes the inspection system to perform perspective transformation to convert the composite image to plan view, and display the composite image in plan view with the deficient growth regions highlighted.

In one embodiment, a method of inspecting a growth area for plants is disclosed. The method comprises capturing a plurality of digital images of the growth area for the plants from different angles in relation to the growth area, processing the digital images to identify a boundary of the growth area in the digital images, combining the digital images based on the boundary identified in the digital images to generate a composite image of the growth area, performing image processing on the composite image to detect one or more deficient growth regions in the growth area, highlighting the deficient growth regions in the composite image, and displaying the composite image with the deficient growth regions highlighted.

In one embodiment, the digital images are captured with at least one camera mounted on a mobile platform.

In one embodiment, processing the digital images to identify a boundary of the growth area in the digital images comprises identifying predetermined information for the growth area including coordinates for corners of the boundary in a coordinate system, identifying pose information associated with the digital images, identifying pixels in the digital images corresponding with the corners based on the pose information and the coordinates for the corners of the boundary in the coordinate system, and determining coordinates for the pixels based on the pose information and the coordinates for the corners of the boundary.

In one embodiment, combining the digital images based on the boundary identified in the digital images comprises stitching the digital images based on the pixels corresponding with the corners to generate the composite image of the growth area.

In one embodiment, performing image processing on the composite image to detect the one or more deficient growth regions in the growth area comprises extracting a hue of an HSV color scale for pixels of the composite image, identifying a set of the pixels having a hue within a color range, generating a binary mask based on the set of the pixels, and overlaying the binary mask on the composite image to detect the deficient growth regions.

In one embodiment, highlighting the deficient growth regions in the composite image comprises filling pixels of the composite image corresponding with the deficient growth regions with a distinctive color.

In one embodiment, highlighting the deficient growth regions in the composite image comprises drawing a free-form shape around contours of the deficient growth regions in the composite image.

In one embodiment, highlighting the deficient growth regions in the composite image comprises determining a largest one of the deficient growth regions in the growth area, and drawing a bounding box around the largest one of the deficient growth regions in the composite image.

In one embodiment, displaying the composite image with the deficient growth regions highlighted comprises performing perspective transformation to convert the composite image to plan view, and displaying the composite image in plan view with the deficient growth regions highlighted.

Other embodiments may include computer readable media, other systems, or other methods as described below.

The above summary provides a basic understanding of some aspects of the specification. This summary is not an extensive overview of the specification. It is intended to neither identify key or critical elements of the specification nor delineate any scope of the particular embodiments of the specification, or any scope of the claims. Its sole purpose is to present some concepts of the specification in a simplified form as a prelude to the more detailed description that is presented later.

DESCRIPTION OF THE DRAWINGS

Some embodiments of the invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments. It will thus be appreciated that those skilled in the art will be able to devise various arrangements that, although not explicitly described or shown herein, embody the principles of the embodiments and are included within the scope of the embodiments. Furthermore, any examples described herein are intended to aid in understanding the principles of the embodiments, and are to be construed as being without limitation to such specifically recited examples and conditions. As a result, the inventive concept(s) is not limited to the specific embodiments or examples described below, but by the claims and their equivalents.

Figure 1:
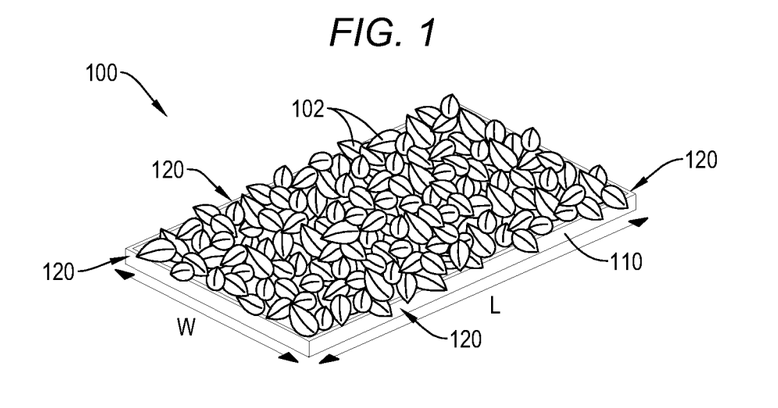
FIG. 1 is a perspective view of a growth area in an illustrative embodiment.

FIG. 1 is a perspective view of a growth area 100 in an illustrative embodiment. A growth area 100 is a region or space designated for growing plants 102 (also referred to as crops, vegetation, etc.). Growth area 100 has known dimensions. For example, growth area 100 as shown in FIG. 1 has a known width (W) and length (L). Although being shown as rectangular, growth area 100 may have other known dimensions in other embodiments.

In one embodiment, growth area 100 may be defined by a growth tray 110. Growth tray 110 is an open receptable configured to hold or contain plants 102. The boundary 120 of growth area 100 may therefore be defined by edges or sides of growth tray 110.

Growth area 100 may be in an outdoor environment or an indoor environment. In one embodiment, growth area 100 may be in a greenhouse, building, or another indoor structure that provides a controlled environment for growing plants 102, which is also referred to as Controlled-Environment Agriculture (CEA). CEA is used to provide optimal growing conditions throughout the development of plants. For example, CEA may optimize the use of water, nutrients, oxygen, light, etc., during the development of plants. Different types of horticulture may be used for growth area 100, such as traditional soil growth, hydroponics, aeroponics, aquaponics, etc.

Figure 2:
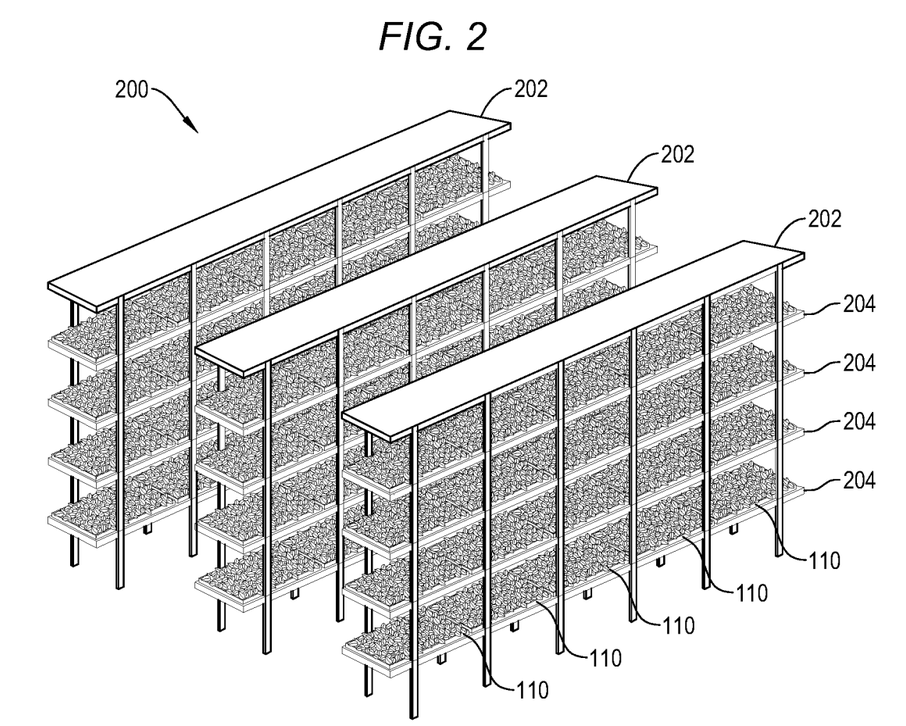
FIG. 2 is a perspective view of a vertical farm in an illustrative embodiment.

Different techniques are available for growing plants 102 in a controlled environment; one of which is vertical farming. Vertical farming is the practice of growing crops in vertically stacked layers. FIG. 2 is a perspective view of a vertical farm 200 in an illustrative embodiment. Vertical farm 200 includes one or more towers 202, which is a vertical structure having multiple shelves or levels 204 that are vertically stacked. Each level 204 is configured to hold or support one or more growth trays 110.

Figure 3:
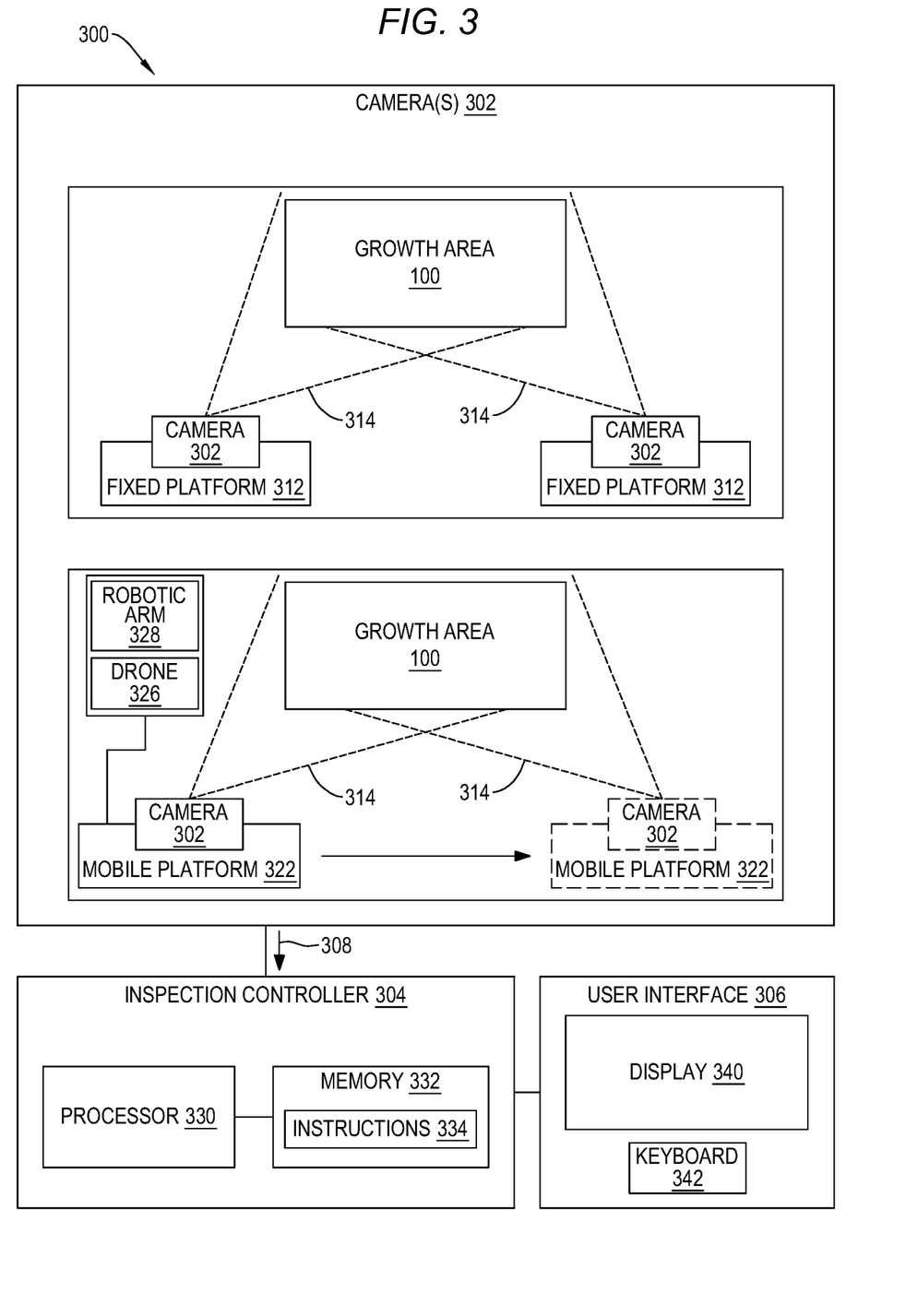
FIG. 3 is a block diagram of an inspection system in an illustrative embodiment.

Embodiments described below provide a way to inspect growth areas 100 to assist in monitoring the development of the plants 102. FIG. 3 is a block diagram of an inspection system 300 in an illustrative embodiment. Inspection system 300 comprises a server, device, apparatus, equipment (including hardware), means, etc., configured to inspect one or more growth areas 100. In this embodiment, inspection system 300 includes one or more cameras 302, an inspection controller 304, and a user interface component 306. A camera 302 is a device configured to capture digital images 308. The digital images 308 may be RGB images, thermal images, hyperspectral images, etc. In one embodiment, inspection system 300 may include a plurality of cameras 302 (also referred to as stationary or static cameras) that are each mounted on a fixed platform 312. For example, multiple cameras 302 may be mounted on a tower 202, with each of the cameras 302 configured to capture digital images 308 of a growth area 100. It is assumed that each of the cameras 302 has a different Angle of View (AOV) 314 in relation to a growth area 100. In another embodiment, inspection system 300 may include a camera 302 (or multiple cameras 302) mounted on a moving or mobile platform 322. A mobile platform 322 is a device configured to move sideways, forward, backward, etc., in relation to a growth area 100. As mobile platform 322 moves in relation to a growth area 100, camera 302 has different AOVs 314 in relation to the growth area 100. Some examples of a mobile platform 322 are a drone 326 and a robotic arm 328, although other types of mobile platforms are considered herein. Mobile platform 322 may be moved in a lawnmower pattern or another desired pattern in relation to a tower 202 to capture digital images 308 of multiple growth areas 100 of the tower 202. In other embodiments, a combination of cameras 302 that are stationary and mobile may be used to capture digital images 308 of a growth area 100.

Inspection controller 304 comprises circuitry, logic, hardware, means, etc., configured to receive and process digital images 308 captured by the camera(s) 302. Inspection controller 304 may be implemented on a hardware platform comprised of analog and/or digital circuitry. Inspection controller 304 may be implemented on one or more processors 330 that execute instructions 334 (i.e., computer program code) stored in memory 332. Processor 330 comprises an integrated hardware circuit configured to execute instructions 334, and memory 332 is a computer readable storage medium for data, instructions 334, applications, etc., and is accessible by processor 330.

User interface component 306 is a hardware component for interacting with an end user. For example, user interface component 306 may include a display 340, screen, touch screen, or the like (e.g., a Liquid Crystal Display (LCD), a Light Emitting Diode (LED) display, etc.). User interface component 306 may include a keyboard 342 or keypad, a tracking device (e.g., a trackball or trackpad), a speaker, a microphone, etc.

Inspection system 300 may include additional components that are not shown for the sake of brevity, such as a network interface, a wireless interface (e.g., WiFi, Bluetooth, etc.), and/or other components.

Figure 4:
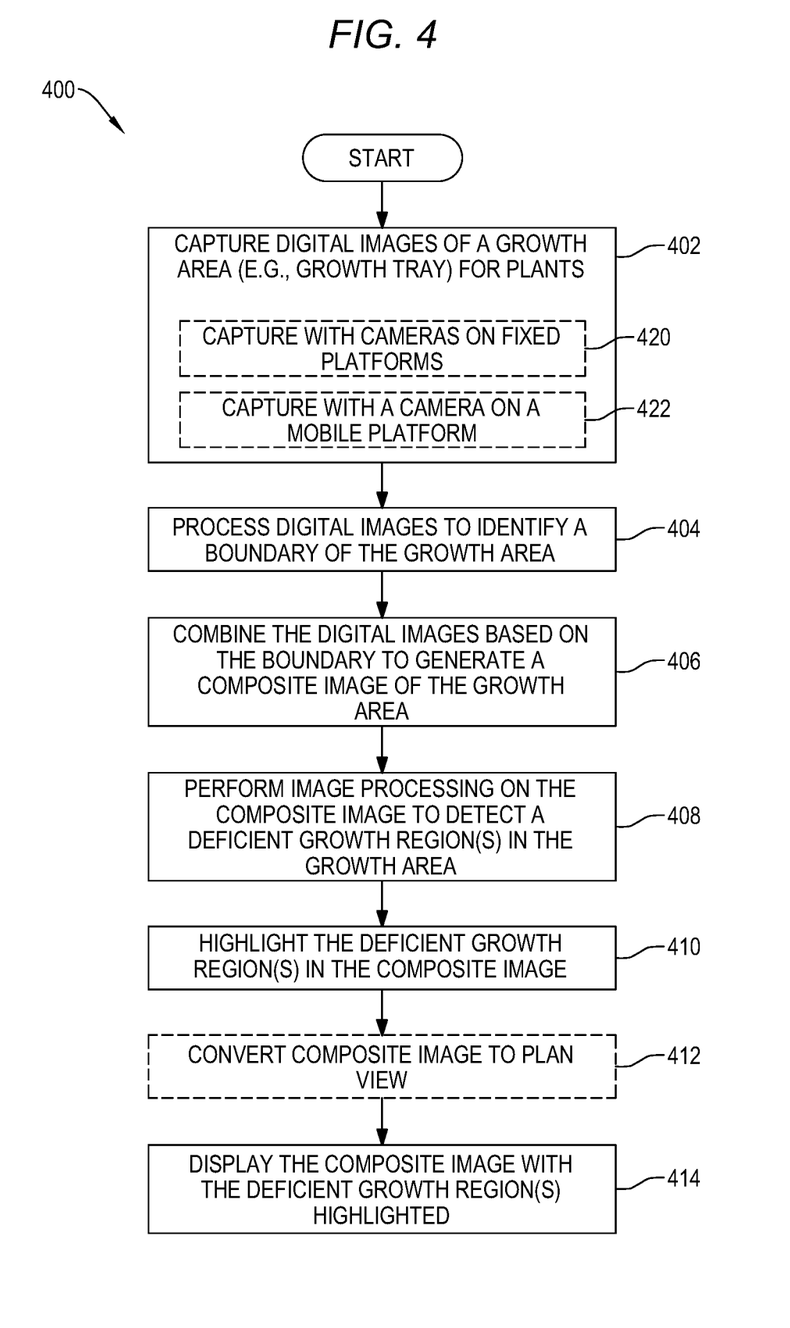
FIG. 4 is a flow chart illustrating a method of inspecting a growth area in an illustrative embodiment.

FIG. 4 is a flow chart illustrating a method 400 of inspecting a growth area 100 in an illustrative embodiment. The steps of method 400 will be described with reference to inspection system 300 in FIG. 3, but those skilled in the art will appreciate that method 400 may be performed in other systems. The steps of the flow charts described herein are not all inclusive and may include other steps not shown, and the steps may be performed in an alternative order.

For method 400, one or more cameras 302 capture a plurality of digital images 308 of a growth area 100 (e.g., growth tray 110) for plants 102 (step 402). It is assumed for this embodiment that the digital images 308 are captured from different angles or different views in relation to the growth areas 100. In one embodiment, multiple cameras 302 mounted on fixed platforms 312 may capture digital images 308 of growth area 100 from different angles (optional step 420). In another embodiment, a camera 302 (or multiple cameras) mounted on mobile platform 322 may capture digital images 308 of growth area 100 from different angles (optional step 422). The camera(s) 302 downloads the digital images 308 to inspection controller 304, such as over a wired or wireless connection.

Inspection controller 304 processes the digital images 308 to identify a boundary 120 of the growth area 100 in the digital images 308 (step 404). The boundary 120 of the growth area 100 is the outer extent where plants 102 are grown or intended to be grown. For example, when growth area 100 is defined by a growth tray 110 as in FIG. 1, the boundary 120 of the growth area 100 is defined by the edges or sides of growth tray 110.

Figure 5:
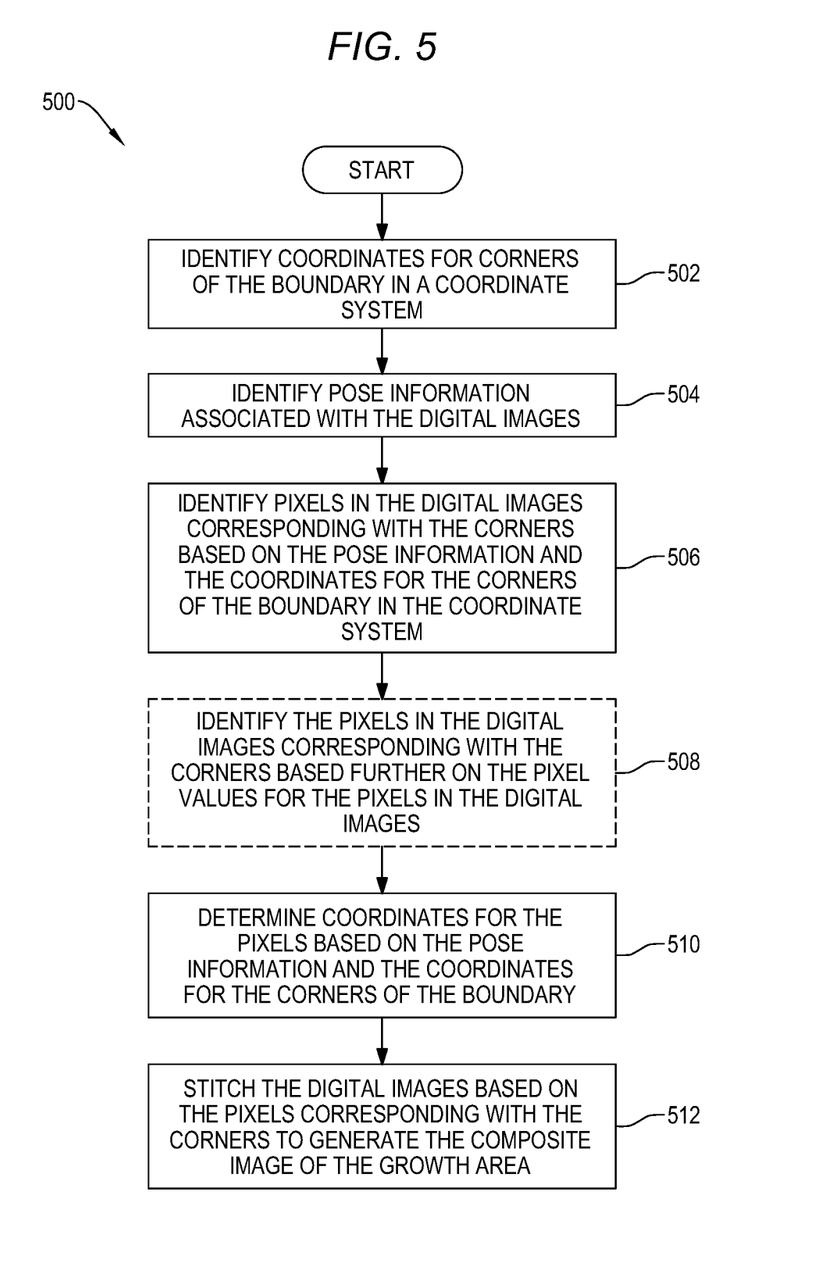
FIG. 5 is a flow chart illustrating a method of processing digital images in an illustrative embodiment.
Figure 6:
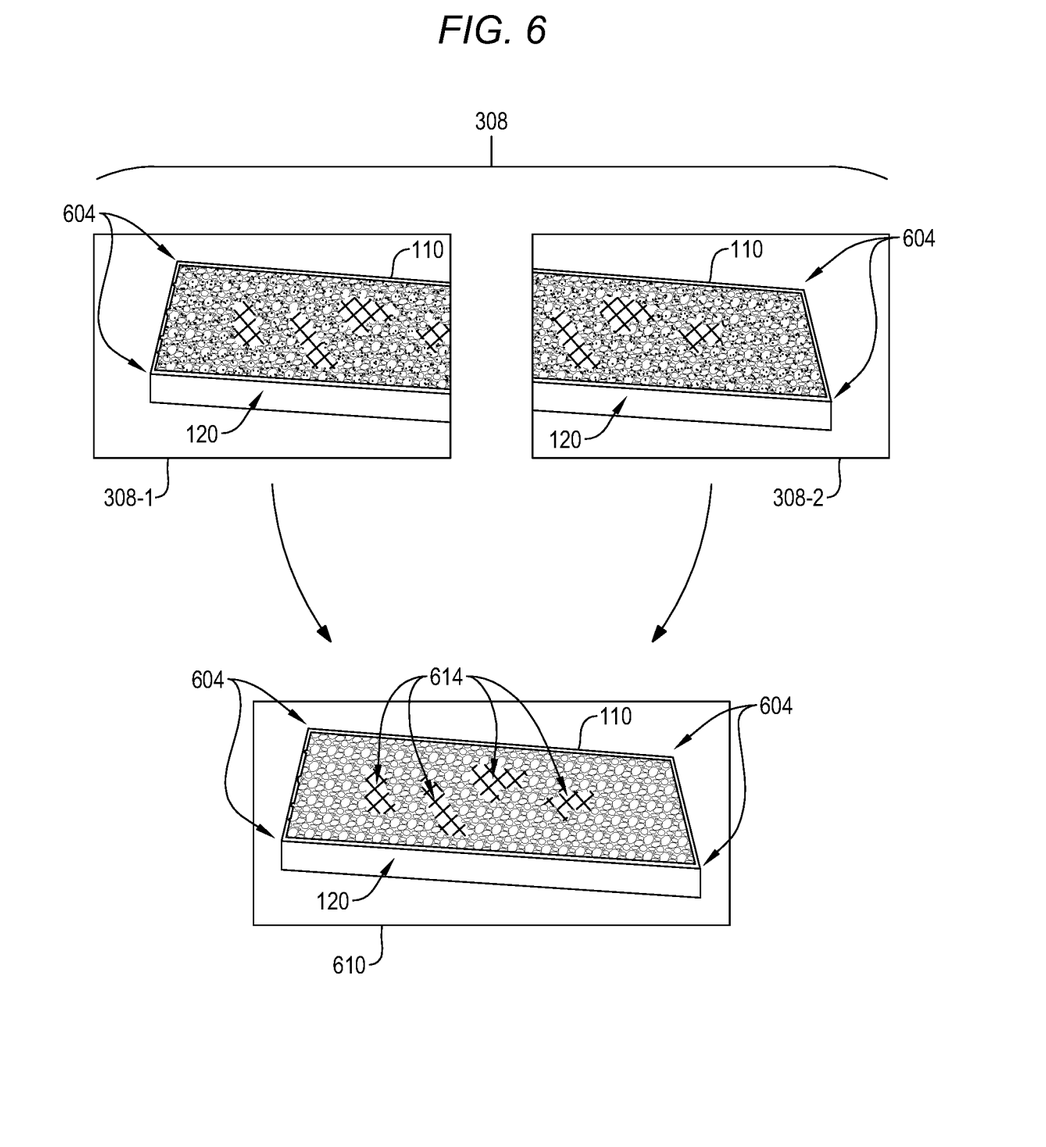
FIG. 6 illustrates a processing of digital images in an illustrative embodiment.

FIG. 5 is a flow chart illustrating a method 500 of processing the digital images 308 in an illustrative embodiment, such as to identify the boundary 120 of the growth area 100. It is assumed for this embodiment that certain information about growth area 100 is known or predetermined. For example, the dimensions of growth area 100, the actual coordinates of boundary 120 and/or corners of boundary 120 in a coordinate system, and/or other information may be predetermined and available to inspection controller 304. FIG. 6 illustrates a processing of digital images 308 in an illustrative embodiment. In this example, two digital images 308-1 and 308-2 have been captured of a growth area 100 defined by a growth tray 110. Digital images 308-1 and 308-2 of growth tray 110 were captured at different angles. Inspection controller 304 identifies predetermined information for growth area 100, which may include the coordinates for the corners 604 of boundary 120, the dimensions of the growth area 100, and/or other information (step 502 in FIG. 5). The coordinates of boundary 120 and/or the corners 604 of boundary 120 are in a coordinate system, such as a real-world coordinate system, where the origin is known. For example, the origin may be a particular location in a controlled environment for growing plants 102, such as a left, bottom of a tower 202 of a vertical farm 200 (see FIG. 2).

Inspection controller 304 also identifies pose information associated with the digital images 308 (step 504). When the camera(s) 302 captures digital images 308, pose information (x,y,z,rx,ry,rz) is also collected as metadata for the digital images 308. The pose information is the position and orientation of a digital image 308 in relation to the camera 302. Inspection controller 304 also knows the Field of View (FOV) of camera 302 when capturing the digital images 308. Based on this information (and possibly other information), inspection controller 304 is able to identify the boundary 120 and/or corners 604 of the boundary 120 in the digital images 308. The corners 604 of the boundary 120, for example, represent distinctive features in the digital images 308 that indicate how the different digital images 308 may overlap (if at all). Thus, inspection controller 304 identifies pixels in the digital images 308 corresponding with the corners 604 of growth area 100 based on the pose information, the coordinates for the corners 604 of the boundary 120 in the coordinate system, and/or other information, such as the dimensions of the growth area 100 (step 506). Inspection controller 304 may also perform feature extraction to identify one or more corners 604 of the boundary 120 in the digital images 308 based on pixel values. Thus, inspection controller 304 may identify the pixels in the digital images 308 corresponding with the corners 604 based further on the pixel values for the pixels in the digital images 308 (optional step 508). Inspection controller 304 then determines coordinates for the pixels in the digital images 308 that correspond with the corners 604 of the boundary 120 based on the pose information and the coordinates for the corners 604 of the boundary 120 (step 510). Thus, for each of the digital images 308, inspection controller 304 determines or calculates pixel coordinates for the pixels representing corners 604 of growth area 100.

In FIG. 4, inspection controller 304 combines the digital images 308 based on the boundary 120 identified in the digital images 308 to generate a composite image of the growth area 100 (step 406). Inspection controller 304 combines the digital images 308 with overlapping Fields of View (FOV) based on the boundary 120 of the growth area 100 found in the digital images 308, which may be referred to as stitching or image stitching. As described in FIG. 5 and shown in FIG. 6, the corners 604 of the growth area 100 provide distinctive features that may be used to determine overlapping FOV in the digital images 308. Thus, inspection controller 304 may stitch the digital images 308 based on the pixels corresponding with the corners 604 of the boundary 120 of growth area 100 to generate the composite image 610 (step 512).

In FIG. 4, inspection controller 304 performs image processing on the composite image 610 to detect one or more deficient growth regions 614 in the growth area 100 (step 408). A grower presumably has an expectation of growth or development of the plants 102 in growth area 100. A deficient growth region 614 is a portion of growth area 100 where the plant growth is below an expected, desired, or threshold level. A deficient growth region 614 may alternatively be referred to as a low plant density region, a poor growth region, a bare region, etc.

Figure 7:
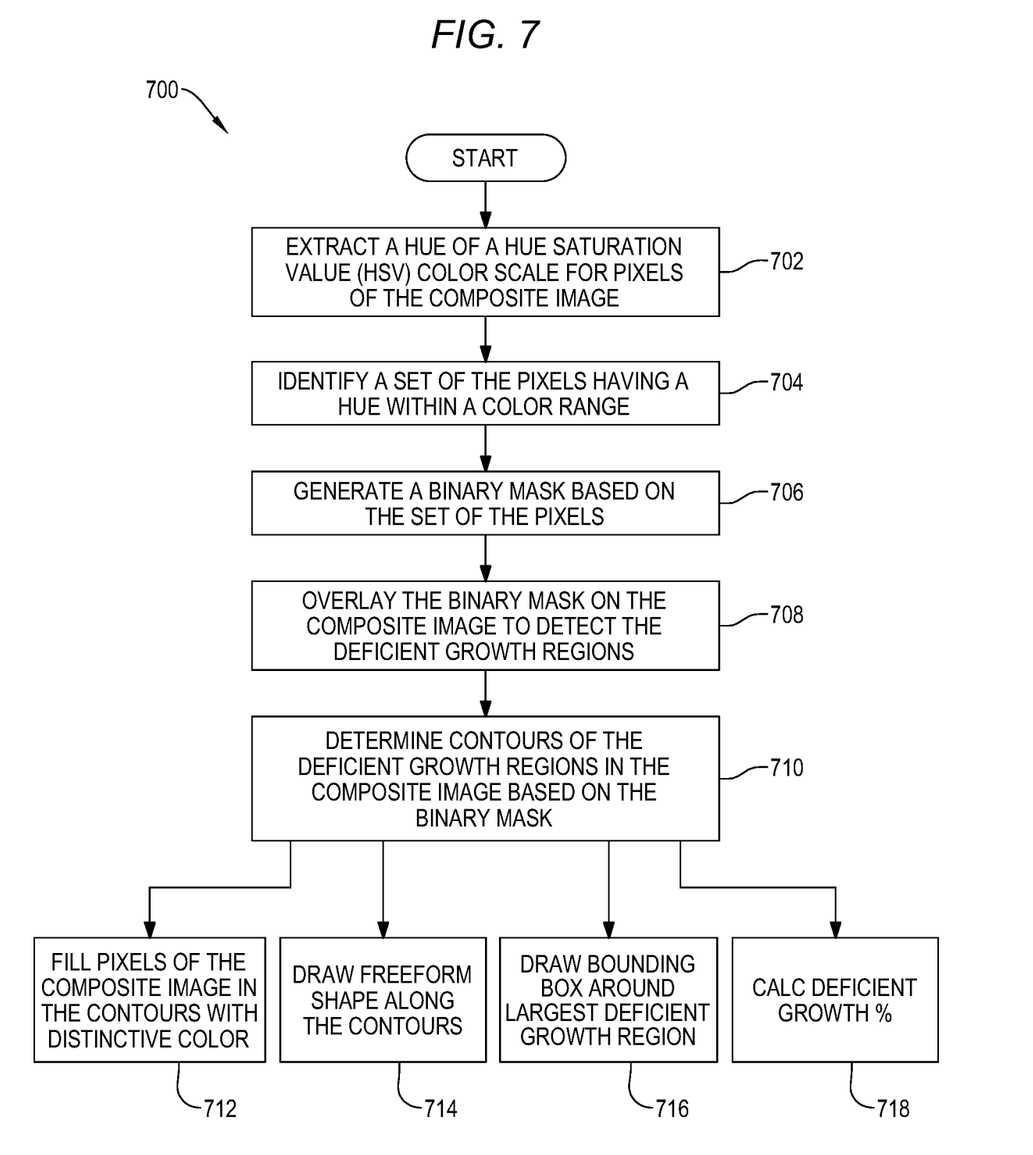
FIG. 7 is a flow chart illustrating a method of image processing a composite image in an illustrative embodiment.

FIG. 7 is a flow chart illustrating a method 700 of image processing the composite image 610 in an illustrative embodiment. In this embodiment, inspection controller 304 processes the composite image 610 to distinguish parts of growth area 100 where plants 102 are growing (i.e., "green" parts) from parts of growth area 100 where plants 102 are not growing. To do so, inspection controller 304 extracts a hue of a Hue Saturation Value (HSV) color scale for pixels of the composite image 610 (step 702). Inspection controller 304 identifies a set of the pixels having a hue within a color range (step 704). The color range is selected to identify plants in the composite image 610. For example, the color range may be between about 121° and 180°, which corresponds with the color green. The color range may also include at least some of the range of between about 61° and 120°, which corresponds with the color yellow. The color range may include other degrees as desired to identify plants in the composite image 610. Inspection controller 304 may also extract a value of the HSV color scale, and identify the set of pixels as also having a value within a brightness range, such as a range of 30%-70%, 20%-80%, or some other range.

Figure 8:
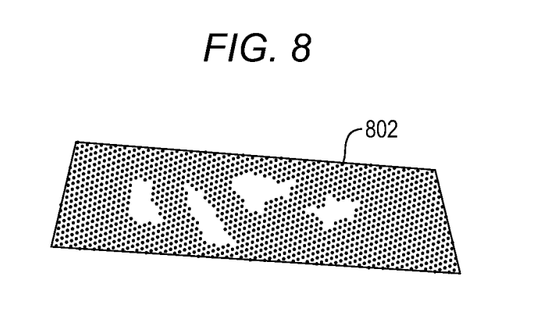
FIG. 8 illustrates a binary mask in an illustrative embodiment.

Inspection controller 304 generates a binary mask based on the set of the pixels (step 706). FIG. 8 illustrates a binary mask 802 in an illustrative embodiment. The binary mask 802 may be used to define the "green" pixels corresponding with a plant 102, and "non-green" pixels that do not correspond with a plant. Thus, the set of pixels may be set to "1" in the binary mask 802, while the other pixels may be set to "0". The non-green pixels in binary mask 802 are shown in white to illustrate the deficient growth regions 614. Inspection controller 304 may perform median filtering or median blur to remove noise and/or smooth edges in the binary mask 802.

In FIG. 7, inspection controller 304 overlays or superimposes the binary mask 802 on the composite image 610 to detect the deficient growth regions 614 (step 708). For example, the deficient growth regions 614 are the pixels of the composite image 610 corresponding with the "0" bits of the binary mask 802. Thus, inspection controller 304 is able to identify which pixels of the composite image 610 correspond with plants 102 and which pixels correspond with a deficient growth region 614 based on the binary mask 802. Inspection controller 304 may perform contour detection on the overlaid image to determine contours of the deficient growth regions 614 (step 710).

Figure 9:
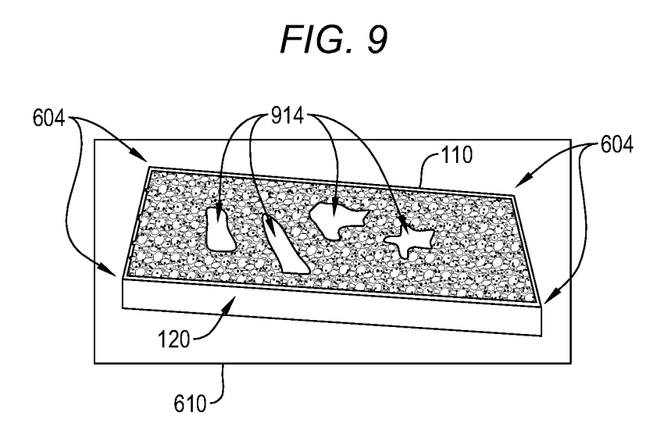
FIG. 9 illustrates deficient growth regions of a composite image filled with a distinctive color.
Figure 10:
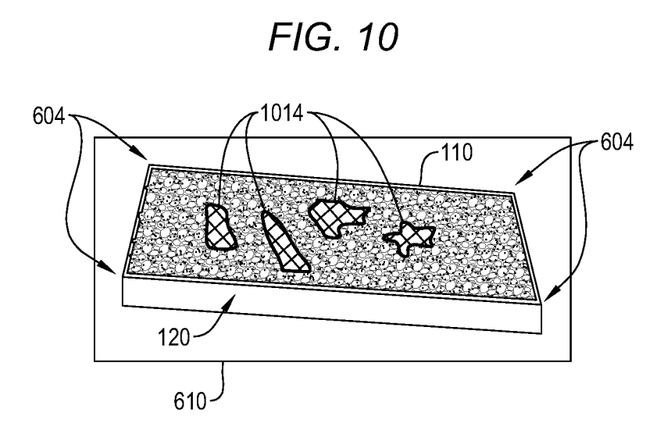
FIG. 10 illustrates deficient growth regions of a composite image highlighted with freeform shapes.
Figure 11:
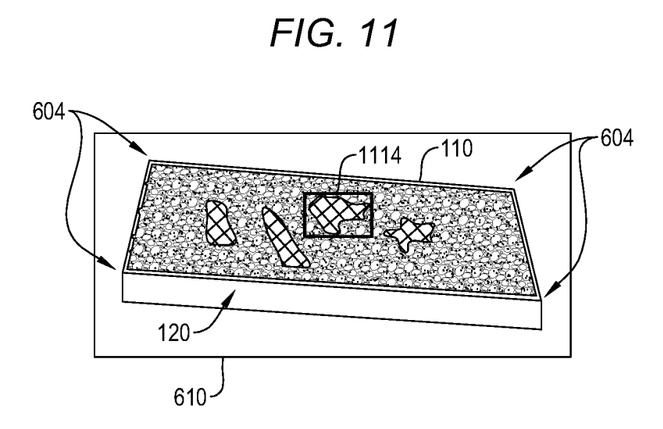
FIG. 11 illustrates the largest deficient growth region of a composite image highlighted with a bounding box.

After detecting one or more deficient growth regions 614 in FIG. 4, inspection controller 304 highlights the deficient growth regions 614 in the composite image 610 (step 410). As in FIG. 7, inspection controller 304 may fill pixels of the composite image 610 (i.e., contour filling) in the contours of the deficient growth regions 614 with a distinctive color (step 712), such as cyan, pink, red, etc. FIG. 9 illustrates the deficient growth regions 614 of the composite image 610 filled with a distinctive color 914. In FIG. 7, inspection controller 304 may draw freeform shapes along the contours of the deficient growth regions (step 714). FIG. 10 illustrates the deficient growth regions 614 of the composite image 610 highlighted with freeform shapes 1014. In FIG. 7, inspection controller 304 may determine the largest one of the deficient growth regions 614, and draw a bounding box around the largest deficient growth region 614 (step 716). FIG. 11 illustrates the largest deficient growth region 614 of the composite image 610 highlighted with a bounding box 1114. In FIG. 7, inspection controller 304 may sum the pixels in the deficient growth regions 614 or in the largest deficient growth region 614, determine a total number of pixels for the growth area 100, and calculate a deficient growth percentage for a combination of the deficient growth regions 614 or for the largest deficient growth region 614 (step 718).

In FIG. 4, user interface component 306 displays the composite image 610 with the deficient growth regions 614 highlighted (step 414). Thus, a grower may view the composite image 610 to readily identify which region(s) of growth area 100 is deficient, and take appropriate actions.

In one embodiment, it may be beneficial to generate a composite image 610 in plan view so that each part of growth area 100 is distinguishable. Thus, inspection controller 304 may perform perspective transformation to convert the digital images 308 or the composite image 610 to plan view. As shown in FIG. 4, inspection controller 304 may convert the composite image 610 to plan view (optional step 412) after the digital images 308 have been combined as in step 406. In another embodiment, inspection controller 304 may convert the digital images 308 to plan view before the digital images 308 are combined as in step 406, resulting in a composite image 610 that is in plan view after stitching the digital images 308 together.

Method 400 may be repeated for a number of growth areas 100, such as in vertical farm 200 in FIG. 2.

Although the above embodiment described inspection of a growth area 100, the concepts described herein may be applied to inspection of other areas that contain or house objects.

Any of the various elements or modules shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non-volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

As used in this application, the term "circuitry" may refer to one or more or all of the following:

(a) hardware-only circuit implementations (such as implementations in only analog and/or digital circuitry);
(b) combinations of hardware circuits and software, such as (as applicable):
 (i) a combination of analog and/or digital hardware circuit(s) with software/firmware; and
 (ii) any portions of hardware processor(s) with software (including digital signal processor(s)), software, and memory(ies) that work together to cause an apparatus, such as a mobile phone or server, to perform various functions); and
(c) hardware circuit(s) and or processor(s), such as a microprocessor(s) or a portion of a microprocessor(s), that requires software (e.g., firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

Although specific embodiments were described herein, the scope of the disclosure is not limited to those specific embodiments. The scope of the disclosure is defined by the following claims and any equivalents thereof.

What is claimed is:

1. An inspection system, comprising:
 at least one processor; and
 at least one memory including computer program code;
 the at least one memory and the computer program code configured to, with the at least one processor, cause the inspection system at least to:
 capture a plurality of digital images of a growth area for plants from different angles in relation to the growth area;
 process the digital images to identify a boundary of the growth area in the digital images;
 combine the digital images based on the boundary identified in the digital images to generate a composite image of the growth area;
 perform image processing on the composite image to detect one or more deficient growth regions in the growth area;
 highlight the deficient growth regions in the composite image; and
 display the composite image with the deficient growth regions highlighted,
 wherein the at least one processor further causes the inspection system to perform the image processing by:
 extracting a hue of a Hue Saturation Value (HSV) color scale for pixels of the composite image;
 identifying a set of the pixels having a hue within a color range;
 generating a binary mask based on the set of the pixels; and
 overlaying the binary mask on the composite image to detect the deficient growth regions.

2. The inspection system of claim 1 wherein:
 the digital images are captured with at least one camera mounted on a mobile platform.

3. The inspection system of claim 1 wherein the at least one processor further causes the inspection system to:
 identify predetermined information for the growth area including coordinates for corners of the boundary in a coordinate system;
 identify pose information associated with the digital images;
 identify pixels in the digital images corresponding with the corners based on the pose information and the coordinates for the corners of the boundary in the coordinate system; and
 determine coordinates for the pixels based on the pose information and the coordinates for the corners of the boundary.

4. The inspection system of claim 3 wherein the at least one processor further causes the inspection system to:
 identify the pixels in the digital images corresponding with the corners based further on pixel values for the pixels in the digital images.

5. The inspection system of claim 3 wherein the at least one processor further causes the inspection system to:
 stitch the digital images based on the pixels corresponding with the corners to generate the composite image of the growth area.

6. The inspection system of claim 1 wherein:
 the digital images are captured with at least one camera mounted on a drone configured to inspect growth areas of a vertical farm.

7. The inspection system of claim 1 wherein the at least one processor further causes the inspection system to:
 fill pixels of the composite image corresponding with the deficient growth regions with a distinctive color.

8. The inspection system of claim 1 wherein the at least one processor further causes the inspection system to:
 draw a freeform shape around contours of the deficient growth regions in the composite image.

9. The inspection system of claim 1 wherein the at least one processor further causes the inspection system to:
 determine a largest one of the deficient growth regions in the growth area; and
 draw a bounding box around the largest one of the deficient growth regions in the composite image.

10. The inspection system of claim 1 wherein the at least one processor causes the inspection system to:
 perform perspective transformation to convert the composite image to plan view; and
 display the composite image in plan view with the deficient growth regions highlighted.

11. A method of inspecting a growth area for plants, the method comprising:

capturing a plurality of digital images of the growth area for the plants from different angles in relation to the growth area;

processing the digital images to identify a boundary of the growth area in the digital images;

combining the digital images based on the boundary identified in the digital images to generate a composite image of the growth area;

performing image processing on the composite image to detect one or more deficient growth regions in the growth area;

highlighting the deficient growth regions in the composite image; and displaying the composite image with the deficient growth regions highlighted, wherein the performing comprises:
extracting a hue of a Hue Saturation Value (HSV) color scale for pixels of the composite image;
identifying a set of the pixels having a hue within a color range;
generating a binary mask based on the set of the pixels; and
overlaying the binary mask on the composite image to detect the deficient growth regions.

12. The method of claim 11 wherein:
the digital images are captured with at least one camera mounted on a mobile platform.

13. The method of claim 11 wherein processing the digital images to identify a boundary of the growth area in the digital images comprises:
identifying predetermined information for the growth area including coordinates for corners of the boundary in a coordinate system;
identifying pose information associated with the digital images;
identifying pixels in the digital images corresponding with the corners based on the pose information and the coordinates for the corners of the boundary in the coordinate system; and
determining coordinates for the pixels based on the pose information and the coordinates for the corners of the boundary.

14. The method of claim 13 wherein combining the digital images based on the boundary identified in the digital images comprises:
stitching the digital images based on the pixels corresponding with the corners to generate the composite image of the growth area.

15. The method of claim 11 wherein:
the digital images are captured with at least one camera mounted on a drone configured to inspect growth areas of a vertical farm.

16. The method of claim 11 wherein highlighting the deficient growth regions in the composite image comprises:
filling pixels of the composite image corresponding with the deficient growth regions with a distinctive color.

17. The method of claim 11 wherein highlighting the deficient growth regions in the composite image comprises:
drawing a freeform shape around contours of the deficient growth regions in the composite image.

18. The method of claim 11 wherein highlighting the deficient growth regions in the composite image comprises:
determining a largest one of the deficient growth regions in the growth area; and
drawing a bounding box around the largest one of the deficient growth regions in the composite image.

19. The method of claim 11 wherein displaying the composite image with the deficient growth regions highlighted comprises:
performing perspective transformation to convert the composite image to plan view; and
displaying the composite image in plan view with the deficient growth regions highlighted.

20. A non-transitory computer readable medium embodying programmed instructions executed by a processor of an inspection system, wherein the instructions direct the processor to implement a method of inspecting a growth area for plants, the method comprising:
capturing a plurality of digital images of the growth area for the plants from different angles in relation to the growth area;
processing the digital images to identify a boundary of the growth area in the digital images;
combining the digital images based on the boundary identified in the digital images to generate a composite image of the growth area;
performing image processing on the composite image to detect one or more deficient growth regions in the growth area;
highlighting the deficient growth regions in the composite image; and
displaying the composite image with the deficient growth regions highlighted,
wherein the performing comprises:
extracting a hue of a Hue Saturation Value (HSV) color scale for pixels of the composite image;
identifying a set of the pixels having a hue within a color range;
generating a binary mask based on the set of the pixels; and
overlaying the binary mask on the composite image to detect the deficient growth regions.

* * * * *